July 24, 1928. Re. 17,047
F. O. MAHAN
OVERALLS
Original Filed June 8, 1925
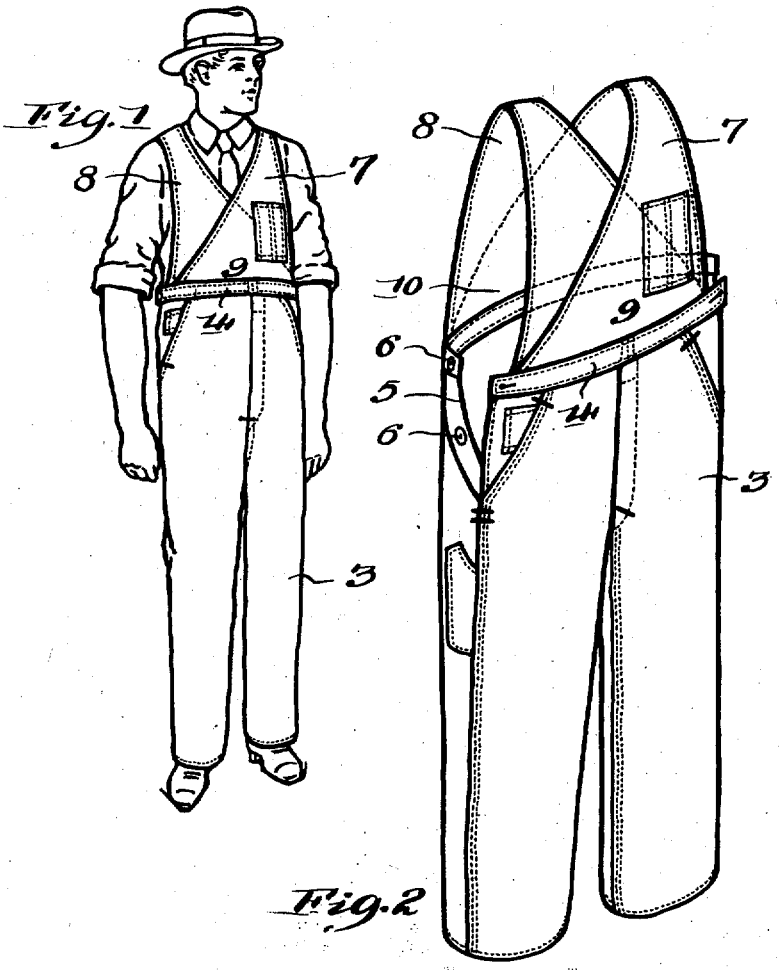
Inventor
Frederic O. Mahan
By Stryker & Stryker
Attorneys Reissued July 24, 1928. Re. 17,047

UNITED STATES PATENT OFFICE.

FREDERIC O. MAHAN, OF EUGENE, OREGON.

OVERALLS.

Original No. 1,590,843, dated June 29, 1926, Serial No. 35,550, filed June 8, 1925. Application for reissue filed November 23, 1927. Serial No. 235,386.

It is the object of this invention to provide an easily adjusted, inexpensive, and unitary over garment, having supporting members without buttons, buckles or other fastening means.

A further object is to provide a garment of this kind with supporting members adapted by reason of their peculiar form, to remain securely in place on the shoulders of the wearer. This invention also includes certain other novel features of construction by which the garment is rendered cooler and lighter than others of the type known as cover-alls.

The accompanying drawings illustrate the best form of my garment at present known to me. In the drawings, Figure 1 is a front view of my improved garment in place on a wearer and Figure 2 is a perspective view of the garment. As illustrated, the lower portion of my over-alls consists of the usual trousers 3, which have a waist band 4 and downwardly extending openings 5 at each side, adapted to be closed, when in use, by suitable buttons 6. To support the trousers 3, I provide two similar bands 7 and 8, each adapted to extend from the front of the waist band 4 over a shoulder of the wearer and then down at the back to the band 4. Each supporting member or band has two substantially triangular portions which are permanently secured at front and back bases 9 and 10 respectively to the trousers 3. The bases of the triangular portions of the members 7 and 8 overlap and extend substantially across the garment at both the front of the band 4 and at the back thereof. One lateral edge of each supporting member thus extends from above one hip of the wearer across the opposite shoulder and then returns to a point above the same hip at the back of the garment, the result being that the members 7 and 8 each support the trousers from hip to hip both in front and behind. The neck opening formed by the supporting members is V-shaped at the front and back of the garment and large openings are allowed for the free movement of the arms at the sides. All fastenings, with the exception of the buttons 6, are permanent.

To put the garment on, it is only necessary to separate the members 7 and 8 at their upper extremities, and to step into the trousers 3. Now said members 7 and 8 are drawn up over the shoulders while inserting the arms into the openings at the sides. As will be readily understood, my improved garment has no tendency to fall off of the shoulders of the wearer, even when one shoulder is elevated above the level of the other, as is the case when reaching upward with one arm. It will also be evident that by reason of the large neck opening and openings at the sides for the arms, the garment is rendered unusually cool and light, and the only adjustment required in donning and removing the over-alls is at the hips. While I have illustrated and described my garment supports attached to trousers, it is obvious that they may be used with a skirt, and such use is within the scope of my invention.

Having described my invention what I claim as new and desire to protect by Letters Patent is:

1. In a sleeveless overall, the combination with a leg covering member having a waist line opening adjacent to each hip, of supporting members adapted to extend over the shoulders of the wearer and having substantially triangular front and rear portions severally free at their side edges, the bases of said portions overlapping and extending substantially from one of said openings to the other.

2. In a sleeveless overall, the combination with a leg covering member having a waist line opening adjacent to each hip, of supporting members adapted to extend over the shoulders of the wearer and having substantially triangular inner and outer portions severally free at their side edges, the bases of said portions overlapping and each base extending substantially from one of said openings to the other.

3. In a sleeveless overall, the combination with a leg covering member having a waist line opening adjacent to each hip, of two supporting members adapted to extend over opposite shoulders of the wearer and each of said members having a substantially triangular portion free at its side edges, the bases of said portions overlapping and each base extending substantially from one of said openings to the other.

In testimony whereof, I have hereunto signed my name to this specification.

FREDERIC O. MAHAN.